United States Patent
Lu et al.

(10) Patent No.: US 7,126,908 B1
(45) Date of Patent: Oct. 24, 2006

(54) METHOD OF PROTECTING AS AGAINST SPAN FAILURES IN A COMMUNICATION NETWORK

(75) Inventors: Biao Lu, Sunnyvale, CA (US); Christopher Liou, Cupertino, CA (US)

(73) Assignee: Ciena Corporation, Linthicum, MD (US)

( * ) Notice: Subject to any disclaimer, the term of this patent is extended or adjusted under 35 U.S.C. 154(b) by 946 days.

(21) Appl. No.: 09/919,779

(22) Filed: Jul. 31, 2001

(51) Int. Cl.
  *G01R 31/08* (2006.01)
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)

(52) U.S. Cl. ...................................................... 370/228
(58) Field of Classification Search ................ 370/216, 370/221–223, 225, 228, 241, 242–245
See application file for complete search history.

(56) References Cited

U.S. PATENT DOCUMENTS

| | | | |
|---|---|---|---|
| 5,239,537 A * | 8/1993 | Sakauchi | 370/218 |
| 5,307,353 A * | 4/1994 | Yamashita et al. | 714/4 |
| 2004/0156310 A1* | 8/2004 | Fredette et al. | 370/216 |

\* cited by examiner

*Primary Examiner*—Kevin C. Harper
(74) *Attorney, Agent, or Firm*—Merek, Blackmon & Voorhees, LLC

(57) ABSTRACT

A method for protecting a span that connects a first node to a second node in a communication network includes the steps of creating a first protection virtual path connecting the first node with the second node through at least a third node using a routing-protocol and a signaling-protocol and monitoring a failure condition in the span. Upon detecting the failure condition in the span, the method also includes the steps of switching automatically to the first protection virtual path, and creating a new protection virtual path, using the routing-protocol and the signaling-protocol, for each span in the first protection virtual path, connecting two nodes at each end of the given span through at least another node.

4 Claims, 9 Drawing Sheets

METHOD OF PROTECTING AS AGAINST SPAN FAILURES IN A COMMUNICATION NETWORK

TECHNICAL FIELD

This invention relates generally to methods and apparatus for protecting network services.

BACKGROUND

In order to provide reliable communication services, SONET ("Synchronous Optical Network") networks usually include mechanisms for protecting against optical fiber failures. SONET networks using ADMs ("Add Drop Multiplexers") are often constructed in the form of rings. Some of these optical rings, such as BLSR ("Bi-Directional Line Switching Ring"), can protect against both a line failure and a span failure.

An example of a SONET BLSR with four ADMs is illustrated in FIG. 1. The BLSR 100 includes ADMs, 110, 120, 130 and 140. Four optical lines connect any two ADMs. Eight spans SP1 to SP8 connect the ADMs to form a bi-directional ring. Each of spans SP1 to SP8 includes one working line and a corresponding protection line. Each of the ADMs adds and/or drops signals to switch data from one span (SP1 to SP8) to another. For example, spans SP1 and SP5 interconnect ADMs 110 and 120 and include working lines carrying data in opposite directions. The protection lines may be used to transmit data in the event an associated working line fails. Data transmitted in such a ring typically must conform to a particular protocol.

BLSR 100 can be configured to provide protection for transmission of data in two ways. First, if a working line fails, the corresponding protection lines may be used. In the alternative, if working lines fail between two ADMs, any communication route directed through the failed line may be rerouted by the ADMs using a process known as span switching. For example, if the working lines between ADM 110 and ADM 120 fail, instead of using the corresponding protection lines, communications may be sent from ADM 110 to ADM 120 via ADM 140 and 130.

Typically, the working and protection lines are provided in a fiber optic bundle. Accordingly, if the working line fails, due to a fiber cut, for example, the corresponding protection line often will also fail. Span switching is thus often preferred to simply switching data from a faulty working line to the protection line.

When ADMs are used for optical line switches, BLSR is one of the preferred sub-network structures. However, a network constructed with switches that are capable of running both routing and signaling protocols, BLSR usually is not the preferred sub-network structure; a mesh structure is generally preferred. For these kinds of networks, there is a need to develop more robust network protection schemes for protecting as against optical line and span failures in the network.

SUMMARY

In one aspect, the invention is directed to a protected span in a communication network. The protected span is protected with both a linear protection and a virtual protection path. Each span in the virtual protection path is optionally protected by linear protection and conditionally protected with another virtual protection path. The protected span may withstand multiple line failures.

In another aspect, the invention is directed to a method for protecting spans in a virtual path connection in a communicating network. The protected span is originally protected with a virtual protection path. If the protected span fails and the virtual protection path is utilized, then, each span in the virtual protection path will be protected with another virtual protection path, provided the required network resources are available.

In one aspect, the invention provides a protected span that includes a first node, a second node, a span connecting the first node with the second node and a path-specifying circuitry in one of the two nodes. The protected span also includes a protection virtual path, specified by the path-specifying circuitry, connecting the first node with the second node through at least a third node. In addition, the protected span includes an automatic protection switch in the first node for automatically switching to the protection virtual path upon detecting a failure condition in the span.

In another aspect the invention provides a smart span that includes a first node, a second node, and a span connecting the first node with the second node. The smart span also has a span type indicator, stored in one of the two nodes, having a value of either the working type or the protecting type for specifying the type of the smart span. In addition, the smart span has electronic path-creating circuitry in one of the two nodes. When the span type indicator is the working type, a protection virtual path connecting the two nodes through a third node, will be created by the electronic path-creating circuitry. Upon detecting a failure condition in the span connecting the first node with the second node, an automatic protection switch in the first or second node will automatically switch to the protection virtual path for connecting the first node with the second node and the span type indicator of each span in the protection virtual path will become working type. The adjacent nodes of each span in the protection virtual path will be connected by a new protection virtual path, created by the electronic path-creating circuitry in one of the two adjacent nodes, through at least another node.

In another aspect the invention provides a node connecting to another node for forming a smart span in a communication network. The node has a span type indicator having a value of either the working type or the protecting type, for specifying the type of the span. The node also has electronic path-specifying circuitry for specifying a protection virtual path, electronic path-creating circuitry, and a protection virtual path connecting the two nodes through a third node when the span type indicator is the working type. In addition, the node also has an automatic protection switch for automatically switching to the protection virtual path upon detecting a failure condition in the smart span.

In another aspect the invention provides a method for protecting a span that has a first node connected a second node through a working line and a protection line and includes the step of creating a protection virtual path connecting the first node with the second node through at least a third node using a routing-protocol and a signaling-protocol. The method also includes the steps of monitoring a failure condition in the working line and switching automatically to the protection line upon detecting the failure condition in the working line. In addition, the method includes the steps of monitoring a failure condition in the protection line and switching automatically to the protection virtual path upon detecting the failure condition in both the working line and the protection line.

In another aspect the invention provides a method for protecting a span that has a first node connecting a second node and includes the step of creating a first protection virtual path connecting the first node with the second node through at least a third node by using a routing-protocol and a signaling-protocol. The method also includes the step of monitoring a failure condition in the span. When a failure condition in the span is detected, the method includes the step of creating a new protection virtual path, using the routing-protocol and the signaling-protocol, for each span in the first protection virtual path. The new protection virtual path connects two adjacent nodes in the first protection path through at least another node.

The details of one or more embodiments of the invention are set forth in the accompanying drawings and the description below. Other features, objects, and advantages of the invention will be apparent from the description and drawings, and from the claims

DESCRIPTION OF DRAWINGS

Like reference symbols in the various drawings indicate like elements.

DETAILED DESCRIPTION

Figure 1:
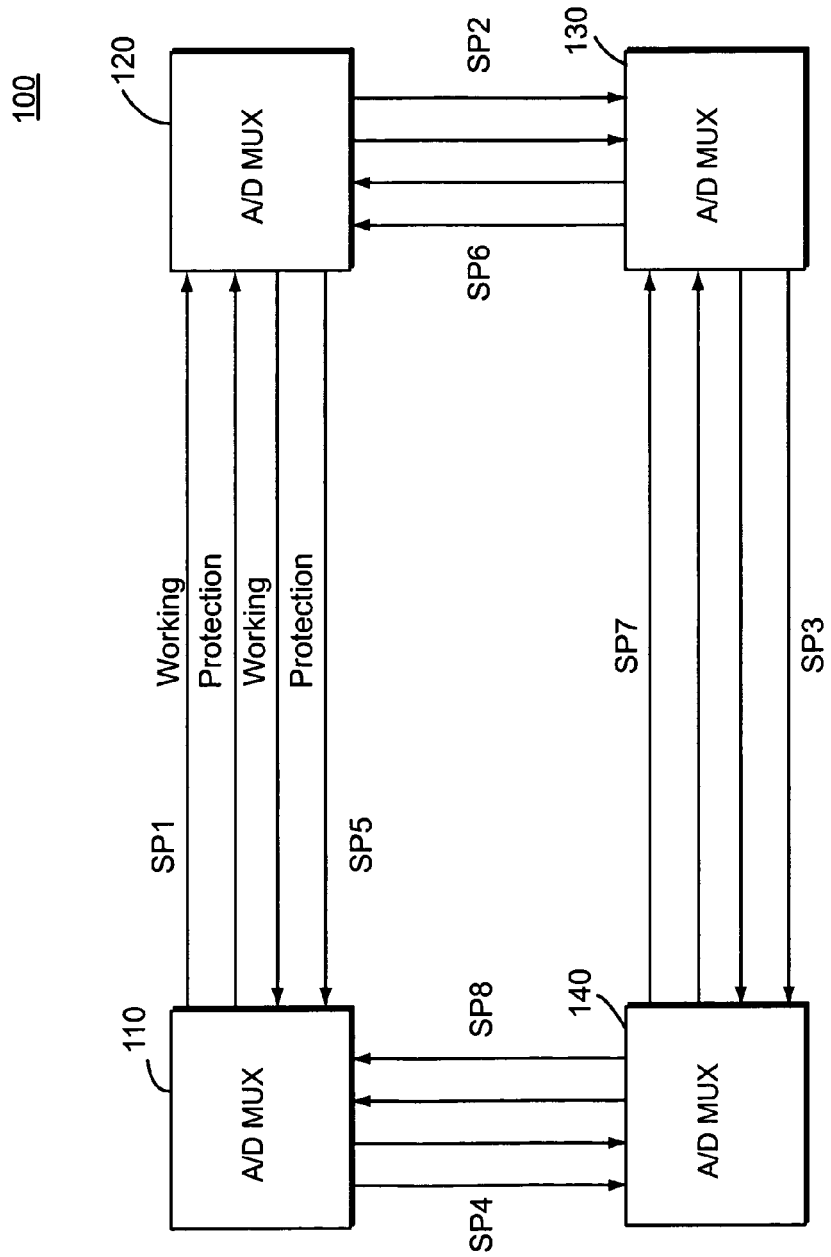
FIG. 1 illustrates a conventional SONET Bi-directional Line Protection Ring.
Figure 2A:
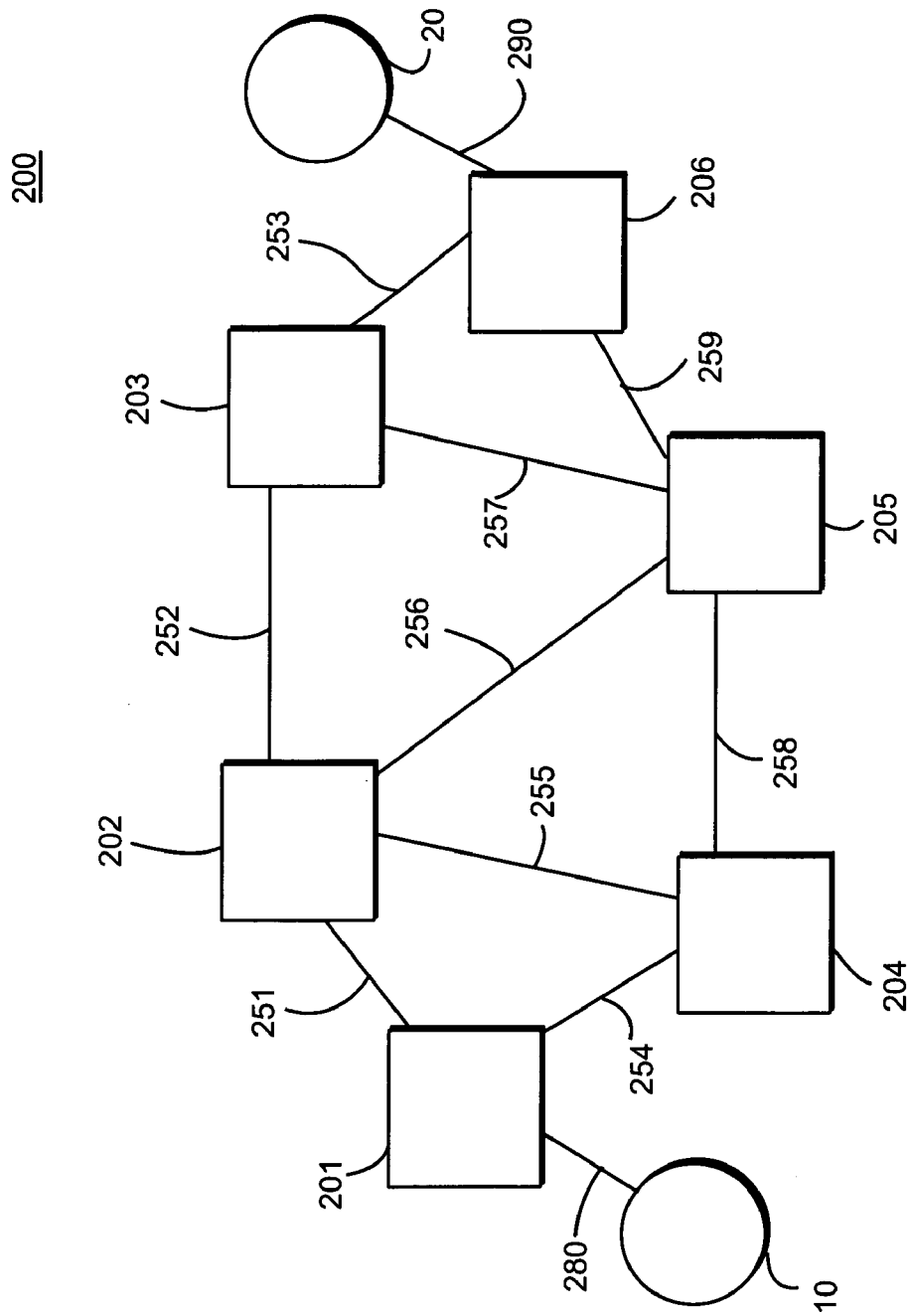
FIG. 2a illustrates a network including nodes connected in a mesh structure.
Figure 2B:
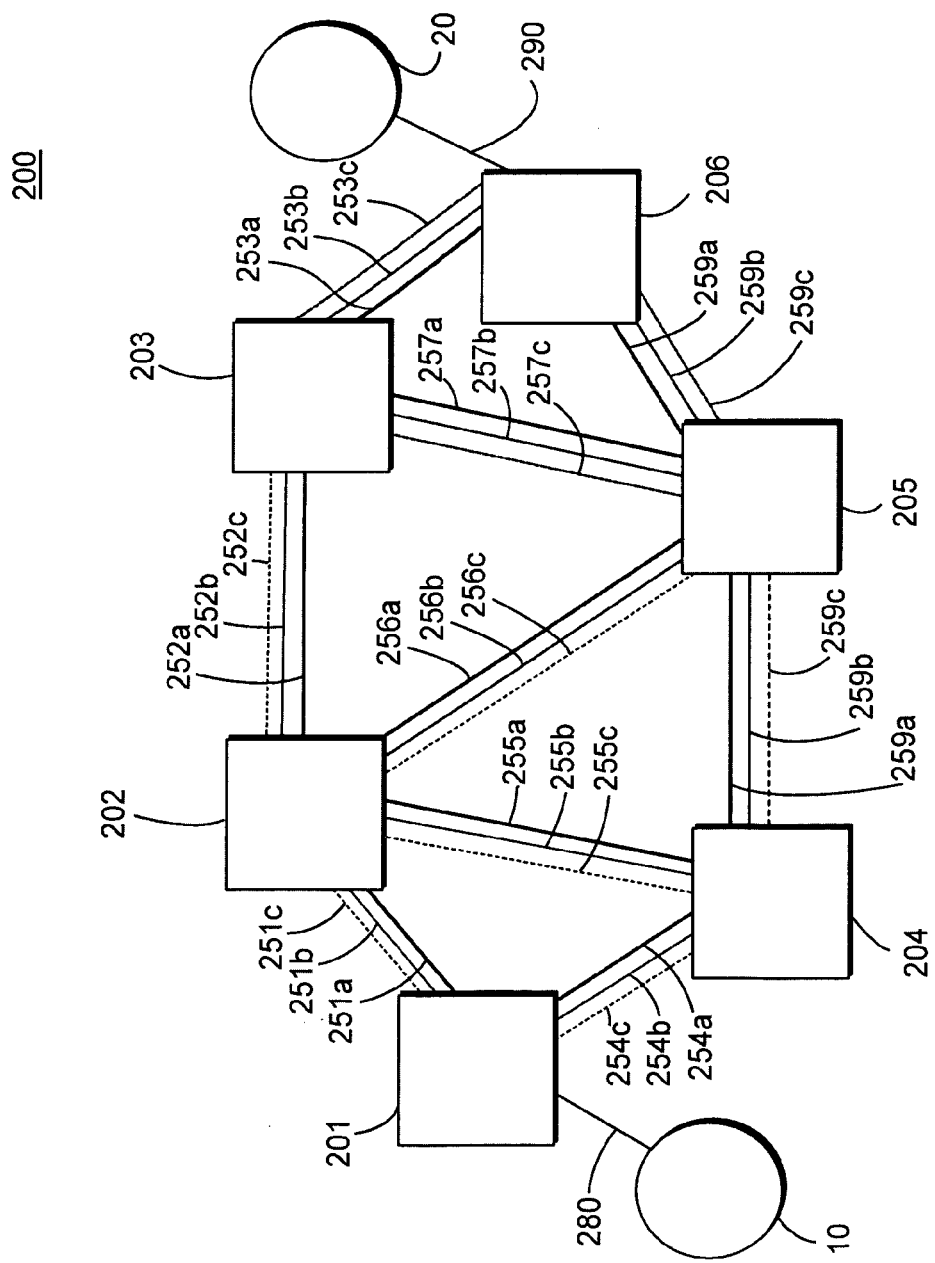
FIG. 2b illustrates a network including spans having two working lines and one protection line.

The present invention includes methods of protecting against span failures in a network of connected nodes. One example of a node is the CoreDirector™ SONET switch manufactured by Ciena, Corperation. Referring to FIG. 2a, network 200 includes a number of interconnected nodes 201–206, which are configured in a mesh structure, in which, each node is connected to one or more other nodes. Network user 10 is connected to network 200 through node 201, and network user 20 through node 206. The connection between two nodes defines a span. Each of spans 251–259 can include one or more lines (e.g. optical fibers). When there are more than one lines in a span, some of the lines can be used as working lines, while others can be used as protection lines. As illustrated in FIG. 2b, each of the spans in network 200 includes two working lines and one protection line. For example, span 256 includes working line 256a, working line 256b and protection line 256c.

The nodes in FIGS. 2a and 2b may include multiple ingress ports and multiple egress ports. Each ingress port or egress port is connected to a physical line that can be an optical fiber, electric cable, an inferred wireless connection, RF connection, or microwave connection. Each physical line can include multiple channels. The multiple channels can be allocated by Time Divisional Multiplexing, Frequency Divisional Multiplexing, Code Divisional Multiplexing, or Dense Wavelength Divisional Multiplexing techniques. By using a cross-connect table, a node can switch a data stream in a channel in an ingress port to a data stream in a channel in an egress port.

The nodes in FIGS. 2a and 2b can be of the form of OXCs ("Optical Cross Connects"). An OXC is an optical switch with multiple ingress ports and multiple egress ports. Each ingress port or egress port can be connected to an optical fiber that may operate in a DWDM ("Dense Wavelength Division Multiplexing") mode. An OXC can be an Optical-Electrical-Optical switch or an Optical-Optical-Optical switch. An OXC can be configured to logically connect the data stream received on an optical fiber in an ingress port to a data stream in an optical fiber in an egress port—i.e., the node is Fiber-Switch Capable. An OXC can be configured to logically connect the data stream of one wavelength in an ingress optical fiber to the data stream of another wavelength in an egress optical fiber—i.e., the node is Lambda Switch Capable. An OXC can be configured to logically connect the data stream of one time slot in an ingress optical fiber to the data stream of another time slot in an egress optical fiber—i.e., the node is Time-Division Multiplex Capable. How each data stream in an ingress port is switched to a data stream in an egress port is determined by a cross-connect table. An OXC can be configured to be Fiber-Switch Capable, Lambda Switch Capable, Time-Division Multiplex Capable, or any combination thereof.

In one implementation, one or more of nodes 201–206 are smart nodes. A smart node is a node that supports both a signaling protocol and a routing protocol. For example, a smart node such as the CoreDirector™ SONET switch manufactured by Ciena Corporation can support an Optical Signaling and Routing Protocol (OSRP). Some of the routing and signaling functions of OSRP are disclosed in U.S. patent application Ser. No. 09/259,263 filed on Mar. 1, 1999, entitled "Routing and Signaling in a SONET Network", and U.S. patent application Ser. No. 09/493,344 filed Jan. 28, 2000, entitled "System and Method for Calculating Protection Routes in a Network Prior to Failure". The entire disclosure of U.S. patent application Ser. Nos. 09/259,263 and 09/493,344 is expressly incorporated by reference. The routing protocol in OSRP is responsible for discovery of neighbors and link status, reliable distribution of routing topology information and optimal route determination. The signaling protocol provides the capability of establishing, tearing down and modifying connections across a network of nodes.

Figure 3:
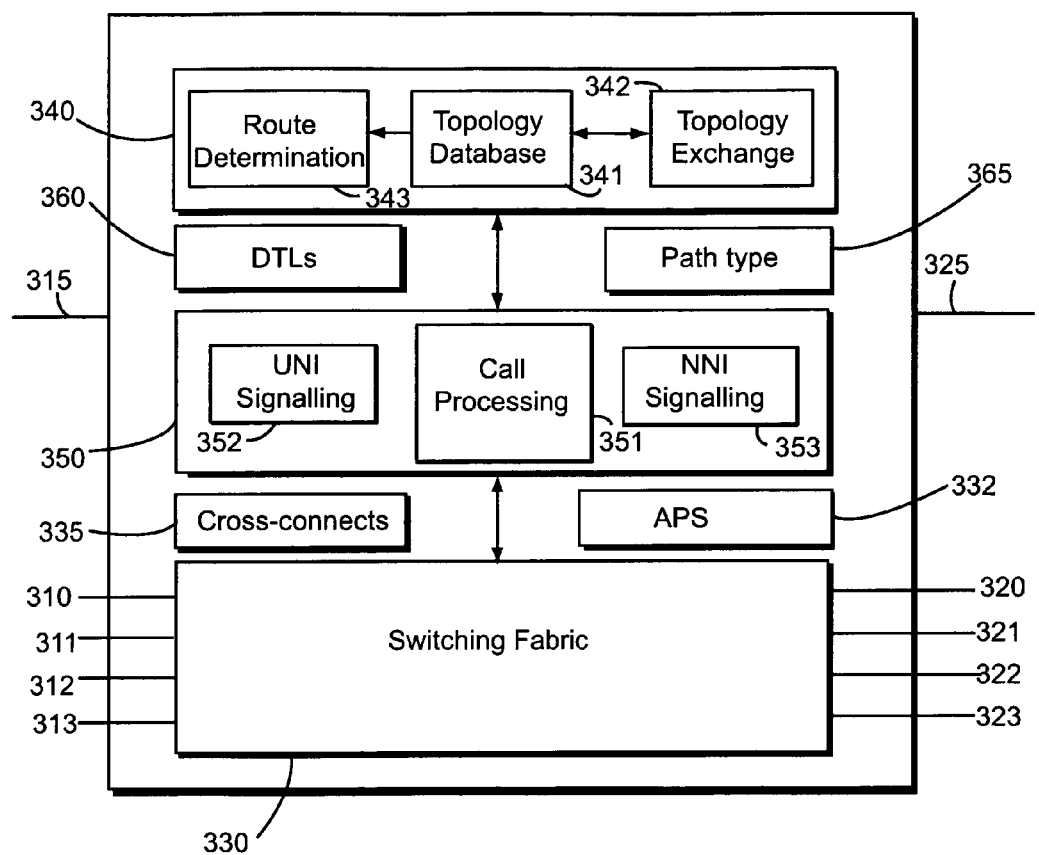
FIG. 3 illustrates in detail a smart node.

FIG. 3 illustrates, in detail, a smart node 300 in accordance with one aspect of the present invention. Node 300 includes ingress lines 310–313, and egress lines 320–323. Each ingress or egress line can support multiple channels. In one implementation, each ingress or egress line can support four channels c1, c2, c3, and c4. A channel in an ingress line can be logically connected to a channel in an egress line through a switch fabric 330. Switch fabric 330 is controlled by a cross-connect table 335.

Cross-connect table 335 may list multiple entries, and each entry may specify how a given channel in a given ingress line is connected to a channel in an egress line. For example, one entry in cross-connect table 335 may specify that a data stream in channel c3 in ingress port 312 be switched to a data stream in channel c1 in egress port 310. Each entry in cross-connect table 335 can be constructed using a path-specification table 360 or using a signaling protocol supported by the node 300.

Path-specification table 360 may list multiple entries, and each entry may specify how a given path connection (either actual or virtual) can be constructed from a list of nodes, ports and channels. One possible way of specifying a given path connection is to use a DTL ("Designated Transit List"). A DTL uses a sequence of Node Ids, Port IDs and optionally channel IDs to specify each node, each port and each channel that the data traffic in a given path connection needs to travel through from the beginning to end.

A virtual path connection defines a protection path that is to be used in the event of a failure in a span in the network. Span protection and the use of virtual path connections are discussed in greater detail below. Virtual path connections can be constructed statically by pre-configuring the cross-connect table in all the nodes in a given virtual path connection. A virtual path connection can also be constructed dynamically, if node 300 supports both a routing protocol and a signaling protocol. A virtual path between two users, between a user and a node, or between two nodes can be determined by the routing protocol. The virtual path can be specified by a DTL. The actual path connection along the path specified by the DTL can be established by the signaling protocol.

The routing protocol and signaling protocol in node 300 may be supported by routing unit 340, signaling unit 350, and optionally port 315 and 325 for establishing out-band signaling and routing connections. Port 315 and 325 is optional, because in-band signaling and routing connections can be established using ingress port 310–313 and egress port 320–323 alone. Signaling unit 350 includes call processing, UNI ("User-to-Network Interface") signaling, and NNI ("Network-to-Network Interface") signaling. Routing unit 340 includes route determination function, a topology exchange function, and a topology database.

APS ("Automatic Protection Switch") 332 in node 300 is responsible for monitoring failure conditions on each of the lines (i.e., working and protection lines) connected to node 300, and for switching to a corresponding protection line (or virtual path connection) when a given working line (protection line) fails. APS 332 may include a linear APS engine that operates to directly replace a failed working line with a protection line in the same span. APS 332 may include a path APS engine for switching to another virtual path connection that is of the protection type.

Node 300 may include a path type unit 365. A path type indicator is assigned by the path type unit 365 and may specify the type of each path connection passing through node 300 as either a working type or a protection type. Working paths are used in the transmission of data. Similarly, protection paths are used to transmit data when a failure arises in a corresponding working line. Virtual protection paths are pre-configured or dynamically configured paths that are used to protect as against a failure in a span (e.g., failure in a protection line after an initial failure in a working line). The virtual protection path may be included in a separate ring from the span that it protects.

For simplifying the explanation for the present invention, all the nodes in FIGS. 4a–4b and 5a–5c are assumed to be CoreDirector™ SONET switches running the OSRP signaling and routing protocol. However, the present invention is not limited to this special kind of node choice.

Figure 4A:
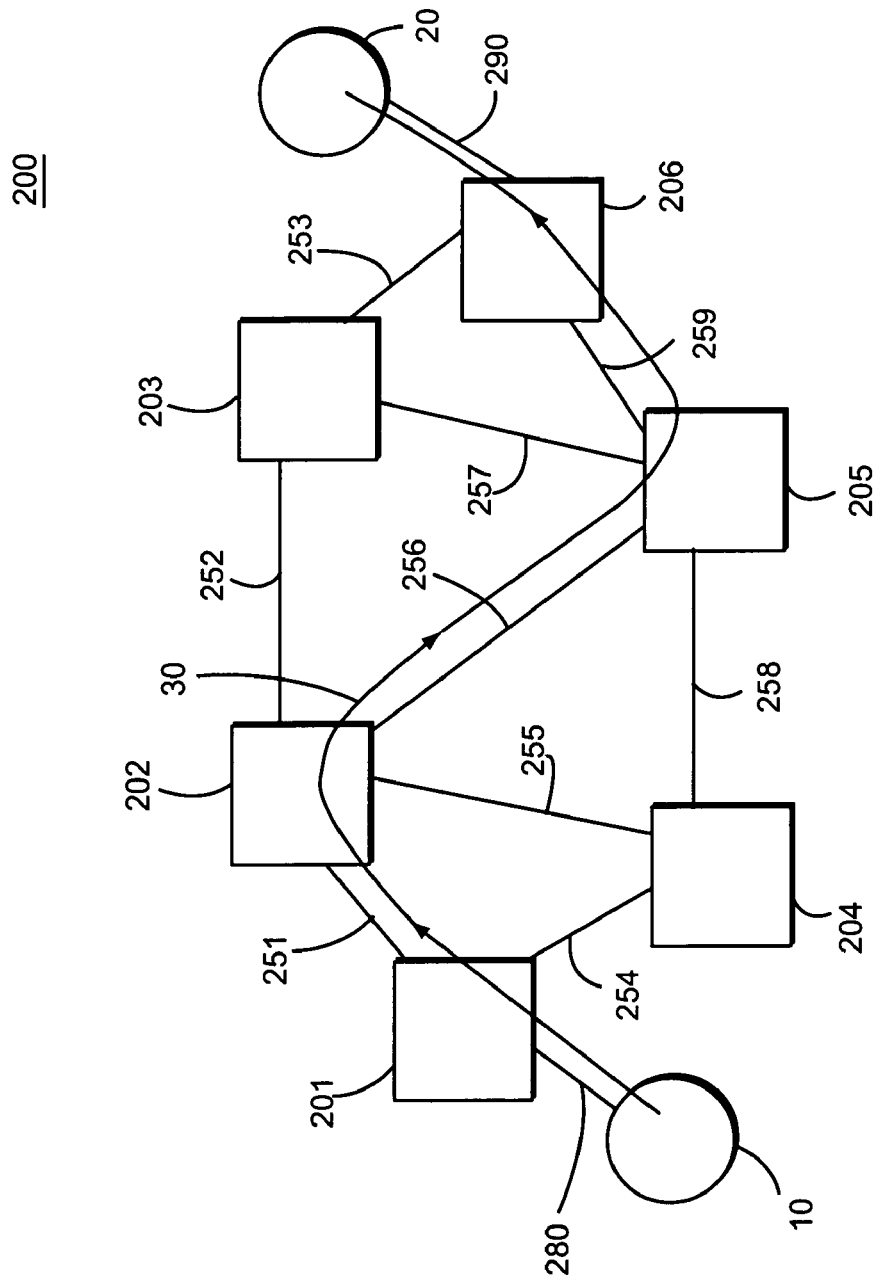
FIG. 4a illustrates a virtual path connection in the network of FIG. 2.

FIG. 4a illustrates that network user 10 can be connected with a network user 20 through path connection 30 that traverses through node 201, 202, 205, and 206. The path connection 30 traverses through spans 251, 256, and 259.

Figure 4B:
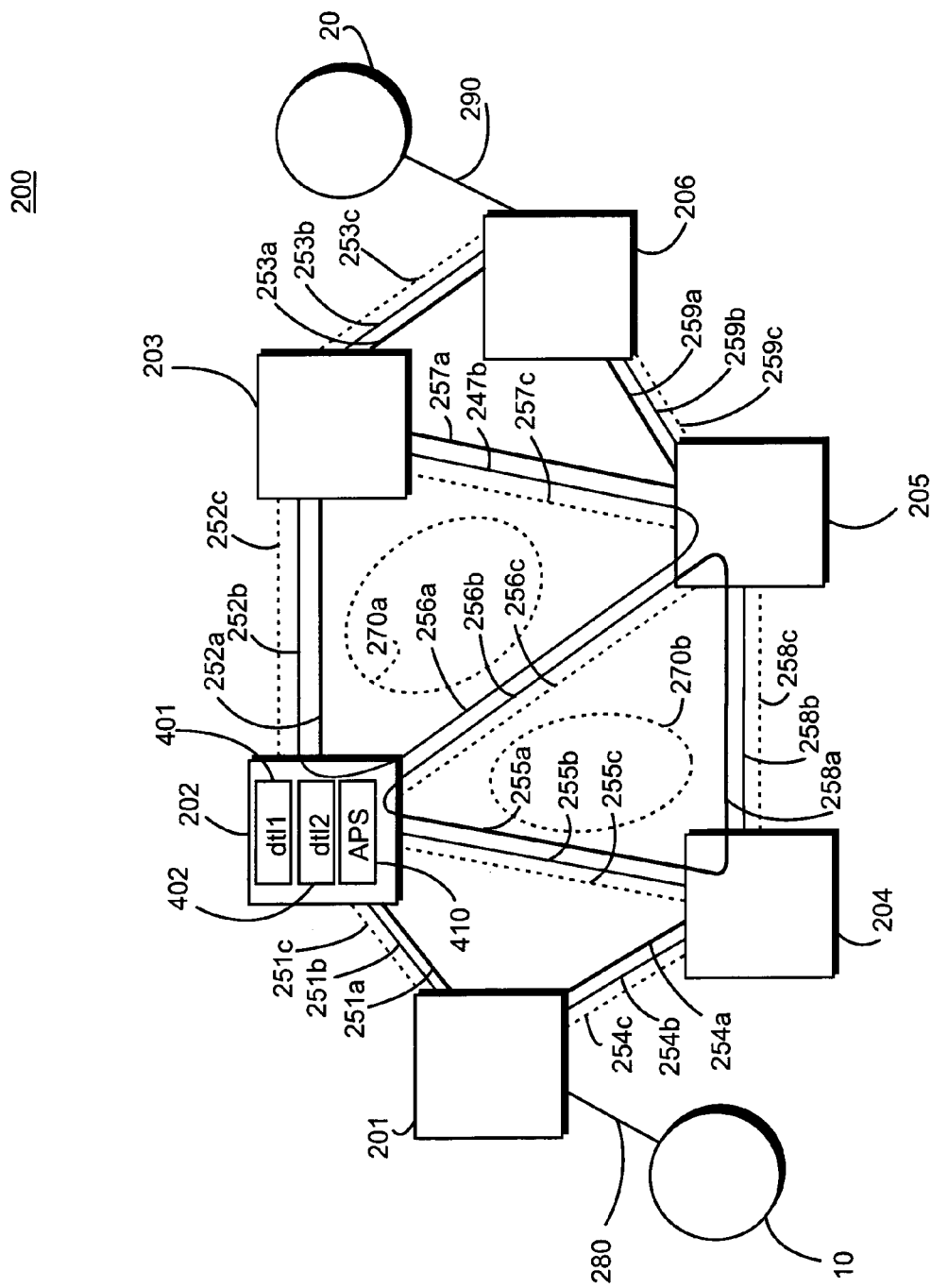
FIG. 4b illustrates an implementation of the present invention in which two protection rings are constructed for a span.

FIG. 4b illustrate how a working line in span 256 that connects node 202 and 205 can be protected. Three optical lines connect node 202 and 205. Working line 256a is used for path connection 30. Working line 256b is used for other path connections. Line 256c is a protection line for both working lines 256a and 256b.

DTL 401 and DTL 402 stored in node 202 can specify a protection virtual paths for working lines 256a and 256b. The protection virtual paths are used when protection line 256c fails.

In FIG. 4b, the protection virtual path specified by DTL 401 connects node 202 with 203 through working line 252b, and node 203 with 205 through working line 257b. The protection virtual path specified by DTL 401 forms protection ring 270a with working line 256a. The protection virtual path specified by DTL 402 connects node 202 with 204 through working line 255a, and node 204 with 205 through working line 258a. The protection virtual path specified by DTL 402 may form protection ring 270b with working lines 256a or 256b.

DTL 401 can be obtained by statically choosing a list of nodes and lines that a pre-determined virtual path needs to traverse. DTL 401 can also be obtained by dynamically using the OSRP routing protocol to determine an optimal route. The protection virtual path connection along the path specified by DTL 401 can be established statically by pre-configuring all the needed cross-connect tables and switches in the respective nodes of the virtual protection path, or established dynamically by using the OSRP signaling protocol.

DTL 402 can also be obtained either statically or dynamically. The protection virtual path connection along the path specified by DTL 402 can be established either statically or dynamically as well.

In the example shown in FIG. 4b, the protection virtual path specified by DTL 401 or 402 is established before data starts to travel along path connection 30 (i.e., creating a pre-configured virtual protection path). By establishing the path prior to data routing, performance guarantees can be assured in the event of failover.

Referring to FIG. 4b, node 202 also includes an APS 410. APS 410 constantly monitors a failure condition on working line 256a. When APS 410 detects a failure condition on working line 256a, APS 410 automatically performs a switching function to replace working line 256a with protection line 256c as the connection between node 202 and 205 for path connection 30. Thereafter, APS 410 continues to monitor a failure condition on protection line 256c.

When APS 410 detects a failure condition on protection line 256c, APS 410 automatically performs a switching function to replace protection line 256c with the protection virtual path specified by DTL 401 for the connection between node 202 and 205 in path connection 30. Alternatively, APS 410 may use the protection virtual path specified by DTL 402 rather than DTL 401 as the replacement for protection line 256c.

If the protection virtual path specified by DTL 401 is used, APSs in node 202, 203, and 205, respectively, monitor the lines included in the protection virtual path. If a line in the protection virtual path (e.g. line 252b) fails, a protection line (e.g. line 252c) can automatically be used as the replacement. Once the protection virtual path specified by either DTL 401 or DTL 402 are active, each respective node along the "new" path 30 may be required to pre-compute new protection virtual paths and associated DTL's to guard against a failure in a given span.

Figure 5A:
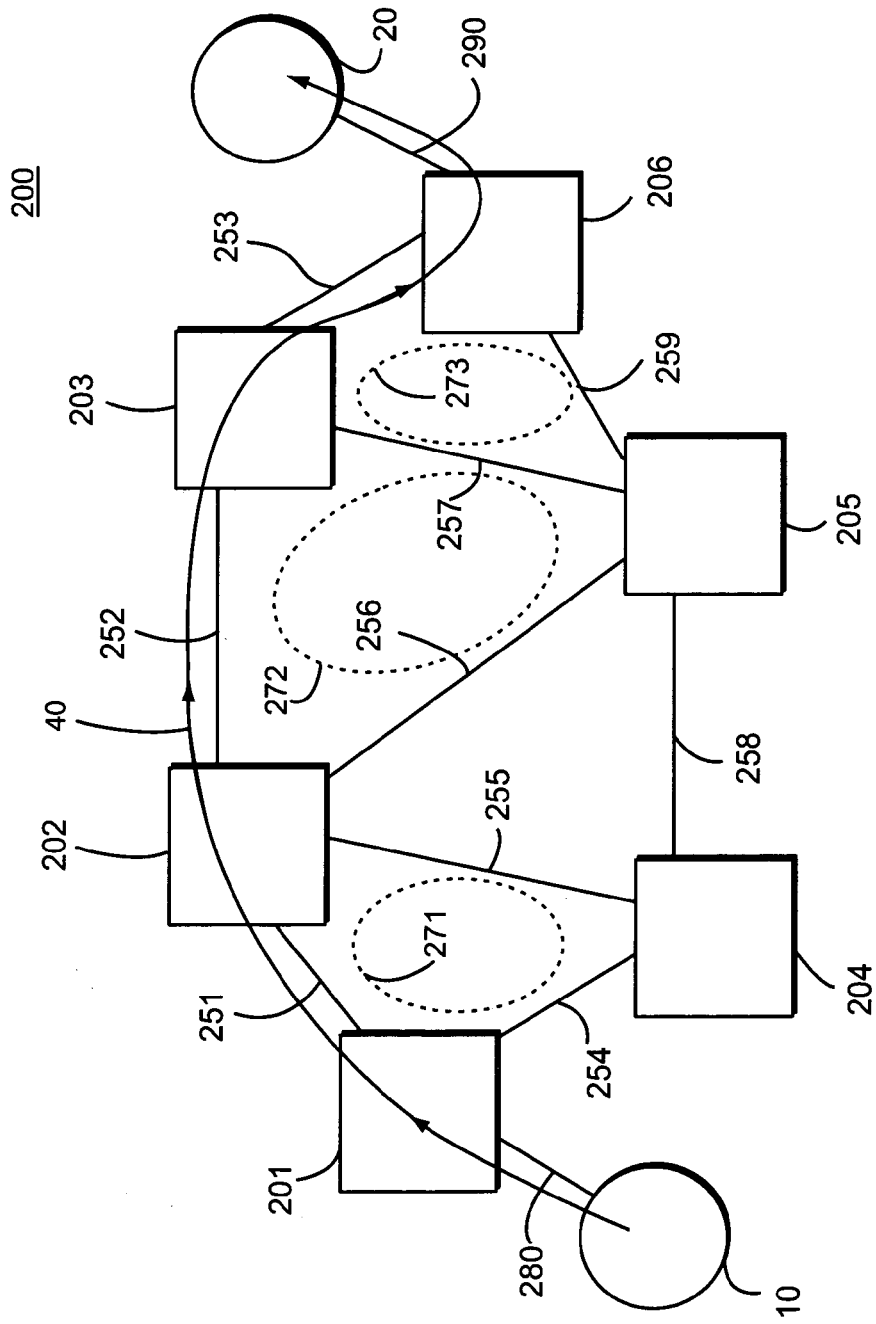
FIG. 5a illustrates a virtual path connection in the network with each span having a ring protection.
Figure 5B:
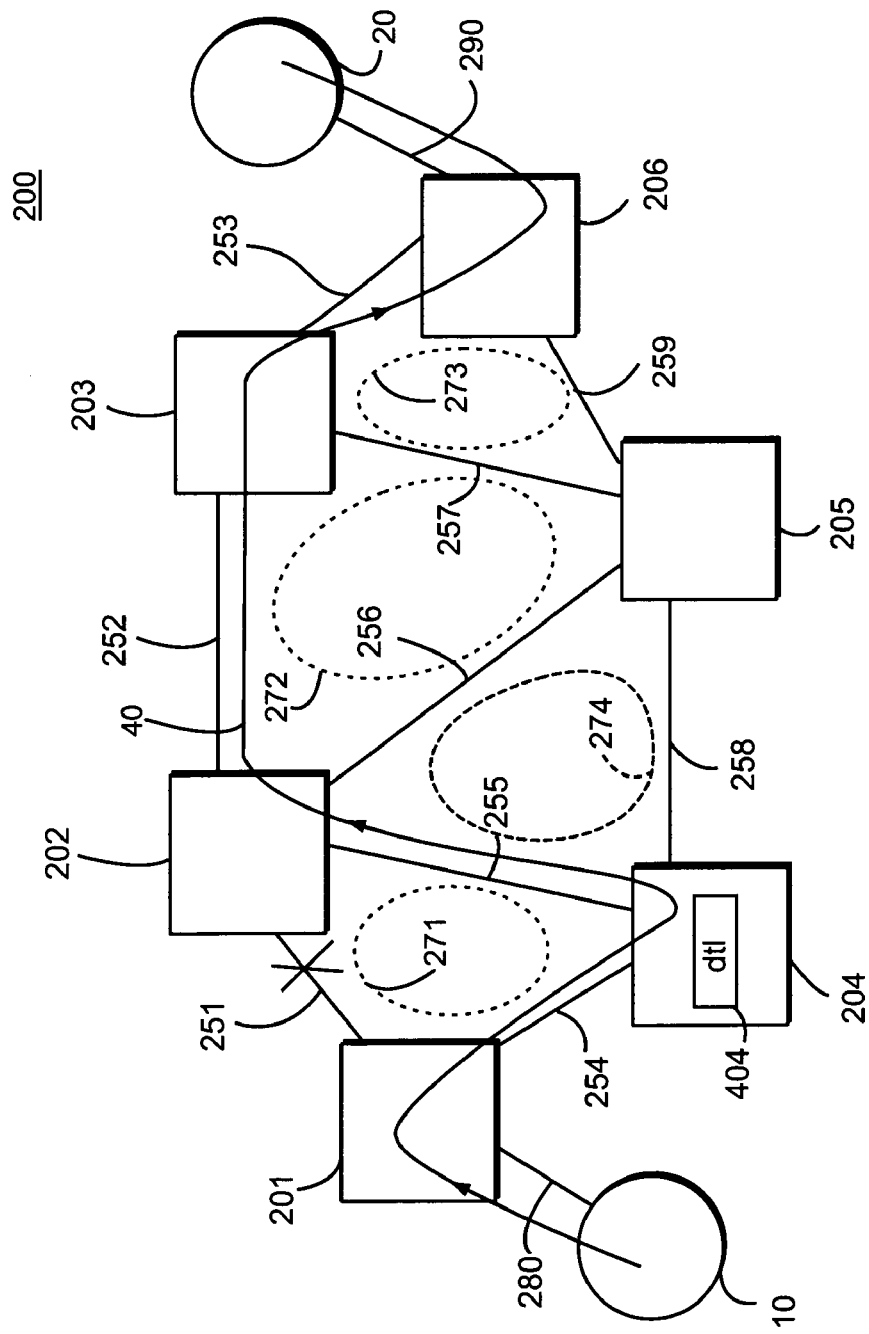
FIG. 5b illustrates an implementation of the present invention in which a failed span is replaced with a protection virtual path.

FIGS. 5a and 5b illustrate a method to protect as against span failures using dynamically constructed protection rings. With this method, no matter how many times span failures occur in a network, each operational span in a path connection is protected by a protection ring, provided enough system resources are available.

Referring to FIG. 5a, network user 10 is connected with network user 20 through path connection 40 that traverses through nodes 201, 202, 203 and 206. Path connection 40 includes spans 251, 252, and 253. Each span in path connection 40 includes a protection ring that is dynamically created. Spans 251, 252, and 253 have associated protection rings 271, 272 and 273 respectively. Data traffic on path connection 40 flows through a working line or a protection line in each span.

Protection ring 271 is a virtual protection path that connects node 201 with 204 through a working line or protection line in span 254, and node 204 with 202 through a working line or protection line in span 255. Similarly, protection ring 272 includes a protection virtual path connecting nodes 202, 205, and 203, and protection ring 273 includes a protection virtual path connecting nodes 203, 205, and 206. Since protection ring 272 and 273 share a common span 257, the protection virtual paths for protection ring 272 and 273 can use one common line or two different lines in span 257 for connecting node 205 and 203.

The protection rings in FIG. 5a and FIG. 5b are created dynamically. And, as such, the path connection 40 can withstand multiple span failures. Span failure can occur in several scenarios. In a first example scenario, a span has only one working line available for path connection 40, all other working lines or protection lines in the span are occupied for other purposes. If the working line fails, the failure will result in a span failure for path connection 40. In a second example scenario, a span has one working line and one protection line available for path connection 40 and all other working lines or protection lines in the span are occupied for other purposes. If both the working line and protection line fail, a span failure is declared for path connection 40.

Referring to FIG. 5b, since span 251 is protected with protection ring 271, if span 251 fails for path connection 40, span 254 and 255 are used as replacements for span 251. Path connection 40 then includes nodes 201, 204, 202, 203, and 206, and spans 254, 255, 252, and 253. Once spans 254 and 255 become part of path connection 40, spans 254 or 255 are provided with their own ring protections, assuming the required resources are available. For example, span 255 can be protected with a newly created protection ring 274 that includes 204, 205 and 202. In FIG. 5b, span 254 is now not protected with a protection ring, because resources are not available to construct such a ring.

When a protection ring is used as a replacement for a span, the process of creating additional protection rings can be achieved automatically using an OSRP signaling and routing protocol. In network 200 (FIG. 2), the topology state information of the network is constantly synchronized among different nodes by exchanging Topology State Elements that contain the topology state parameters of a given node. After an initial failure, the network tries to create a protection ring for each new span in path connection 40, if network resources are available.

For example, when protection ring 271 is used as a replacement for span 251, the nodes in the protection ring—nodes 201, 204, and 202—know that span 254 and span 255 now are used for path connection 40, and each tries to create a new protection rings for the new spans (i.e., for both span 254 and span 255). Each node uses the OSRP routing protocol to determine a protection route that can re-connect the two nodes in the event of a span failure.

Resources may not allow for the creation of a new protection path for a given span. For example, in the example shown in network 200, other than span 254, there are no network resources available to construct another route to connect node 201 with node 204 once a failure arises in span 251. Accordingly, no new virtual protection path is created for span 254.

In network 200, a new protection virtual path can be found to connect node 204 with 205 through span 258, node 205 with 202 through span 256. Each new protection virtual path can be specified by a DTL 404 stored in node 204. Node 204 can use its OSRP signaling protocol to establish a virtual path connection along the route specified by DTL 404.

To summarize, in the span protection process discussed above with relation to FIGS. 5a and 5b, when path connection 40 is created, each working line is always protected with an additional protection virtual path, provided that the required network resources are available. If path connection 40 is morphed to include a new route after certain span failures, the nodes on the new route will try to create an additional protection virtual path for each span in the new route, provided that the required network resources are available. Using the system proposed and assuming sufficient network resources are available, a virtual path connection will not fail due to span failures.

Figure 6:
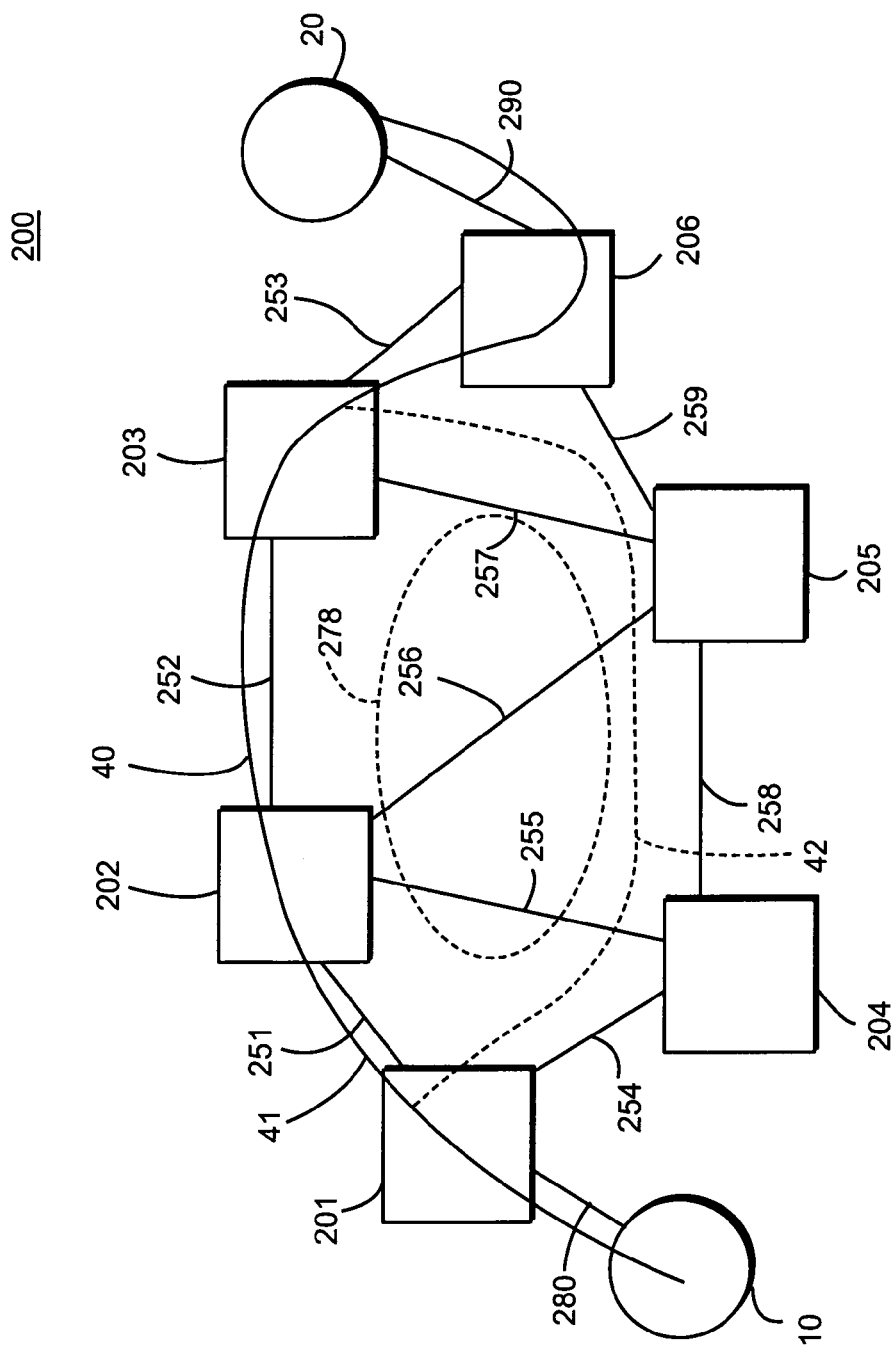
FIG. 6 illustrates an implementation of the present invention in which a virtual path with two spans is protected with a protection ring.

The discussion above focuses on methods and apparatus for protecting as against span failures. In another aspect, the invention provides a virtual path consisting of multiple spans. Referring to FIG. 6, the path 41 starting from node 201, ending at node 203, and through node 202 can be protected with a protection ring 278. Just like the case for protecting a single span, a protection virtual path 42 can be created with the OSRP signaling and routing protocol. The APS in node 201 monitors a failure condition for path 41. Upon detecting the failure condition in path 41, protection virtual path 42 is used as the replacement for path 41. Path connection 40 is accordingly automatically reconfigured and traverses nodes 201, 204, 205, 203, and 206, through spans 254, 258, 257, and 253, respectively.

A number of embodiments of the invention have been described. Nevertheless, it will be understood that various modifications may be made without departing from the spirit and scope of the invention. For example, embodiments of the present invention were discussed in terms of smart nodes such as CoreDirector™ SONET switches. However, alternative embodiments of the present invention can also be applied to networks constructed using other types of network nodes, such as electronic cross connects. Accordingly, other embodiments are within the scope of the following claims.

What is claimed is:

1. A smart span in a communication network comprising:
   a first node;
   a second node;
   a span connecting the first node with the second node with a direct path;
   a path type indicator, stored in one of the two nodes, having a value of either a working type or a protecting type adapted to specify a type of the direct path;
   electronic path-creating circuitry in one of the first and second nodes; and
   when the path type indicator being the working type,
   a protection virtual path connecting the first and second nodes through a third node, created by the electronic path-creating circuitry, and an automatic protection switch in one of the first and second nodes adapted to automatically switch to the protection virtual path upon detecting a failure condition in the span wherein the electronic path-creating circuitry includes electronic circuitry adapted to support a routing-protocol; and electronic circuitry adapted to support a signaling-protocol wherein the protection virtual path comprises an additional smart span including:

an additional direct path connecting two adjacent nodes in the protection virtual path;

an additional path type indicator for the additional direct path adapted to change the value from the protecting type to the working type upon detecting a failure condition in the span connecting the first node with the second node; and additional electronic path-creating circuitry in one of the two adjacent nodes adapted to create an additional protection virtual path connecting the two adjacent nodes through at least another node upon detecting a failure condition in the span connecting the first node with the second node, and said routing protocol is responsible for discovery of neighbors and link status, reliable distribution of routing topology information and optimal route determination, and said signaling protocol provides the capability of establishing, tearing down and modifying connections across network nodes.

2. The smart span of claim 1 wherein one of the first node and the second node includes a designated transit list adapted to specify the protection virtual path.

3. The smart span of claim 1 wherein the span connecting the first node with the second node further includes a protection line, the direct path in the span being a working line.

4. The smart span of claim 3 wherein one of the first node and the second node includes an automatic protection switch adapted to switch from the working line to the protection line upon detecting a failure condition on the working line.

* * * * *